No. 654,136. Patented July 24, 1900.
A. B. COWLES.
PAPER BOX MACHINE.
(Application filed Apr. 20, 1897.)
(No Model.) 11 Sheets—Sheet 1.
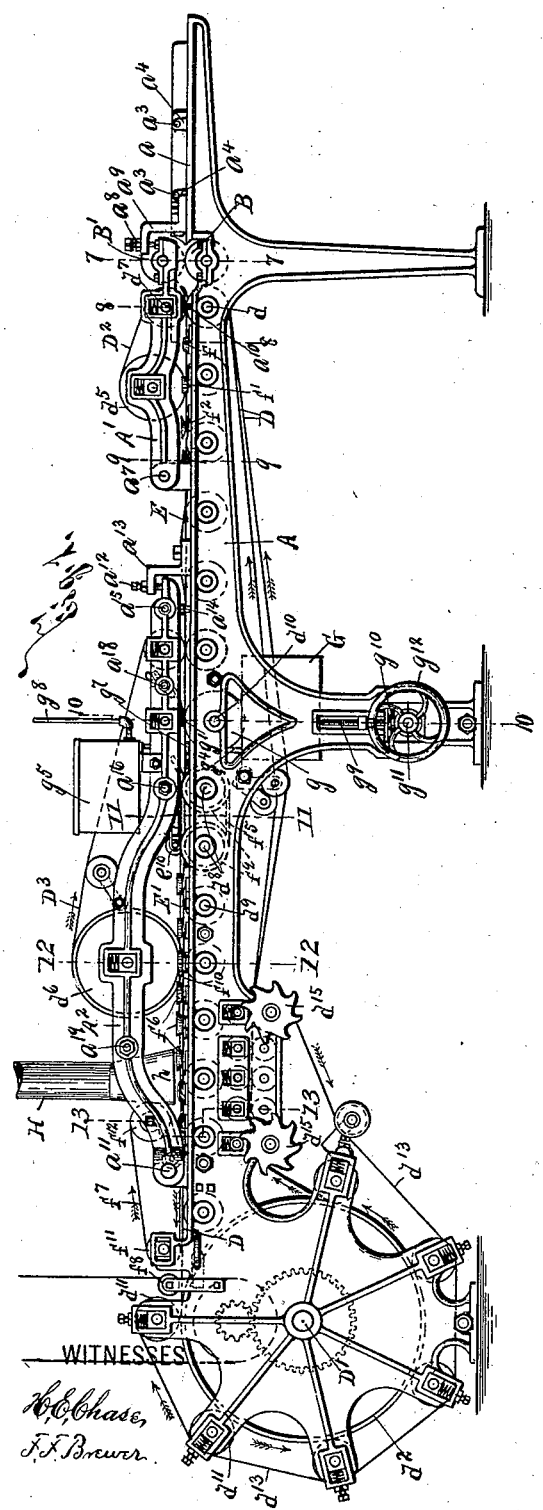
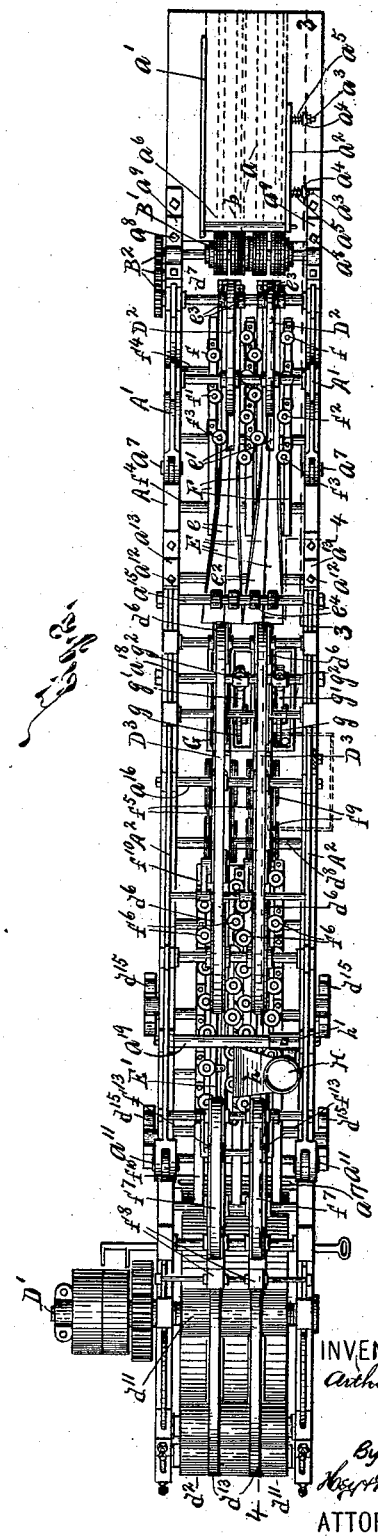
WITNESSES
H. E. Chase,
J. F. Brewer.
INVENTOR
Arthur B. Cowles
By
Hey & Parsons
ATTORNEYS.

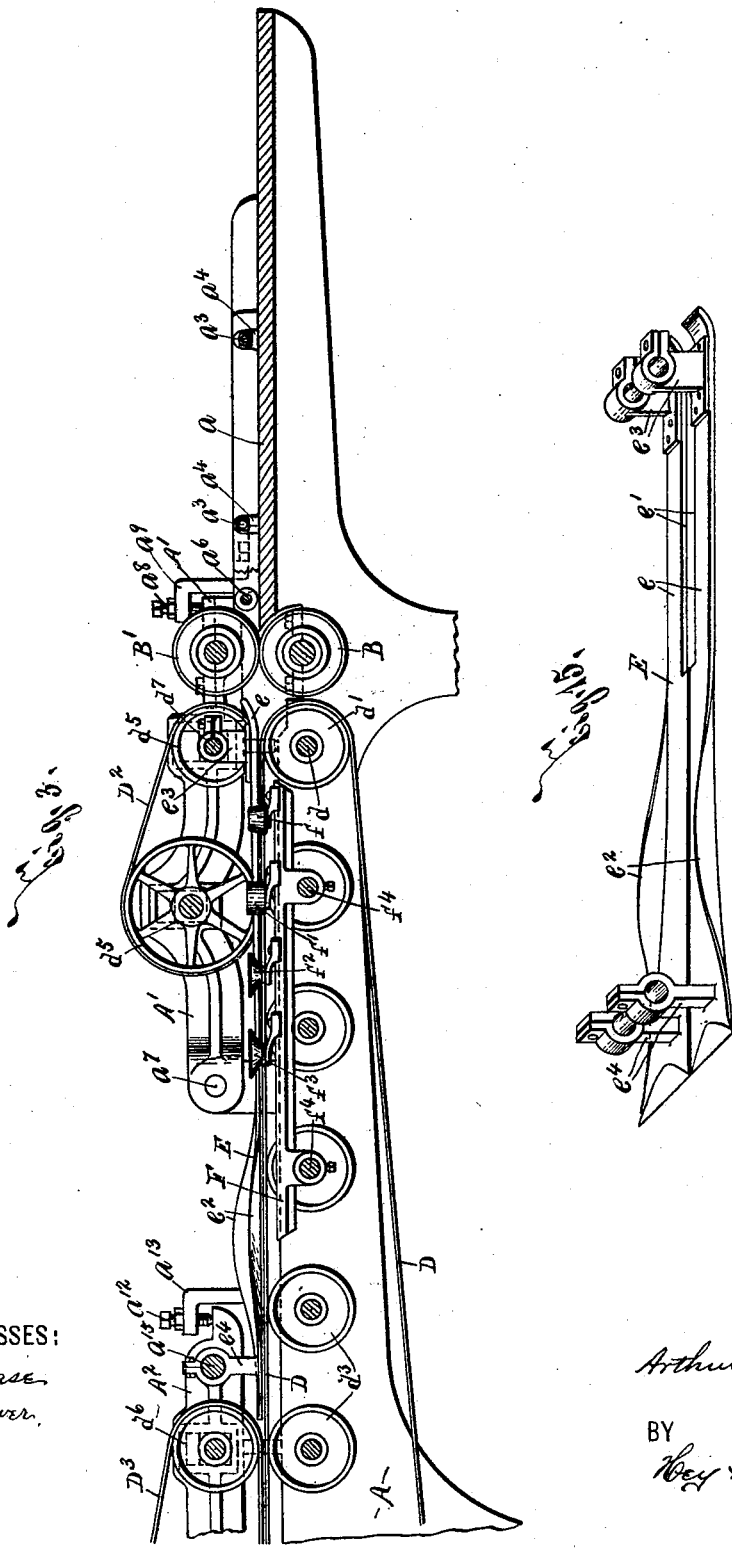

No. 654,136. Patented July 24, 1900.
A. B. COWLES.
PAPER BOX MACHINE.
(Application filed Apr. 20, 1897.)
(No Model.) 11 Sheets—Sheet 3.
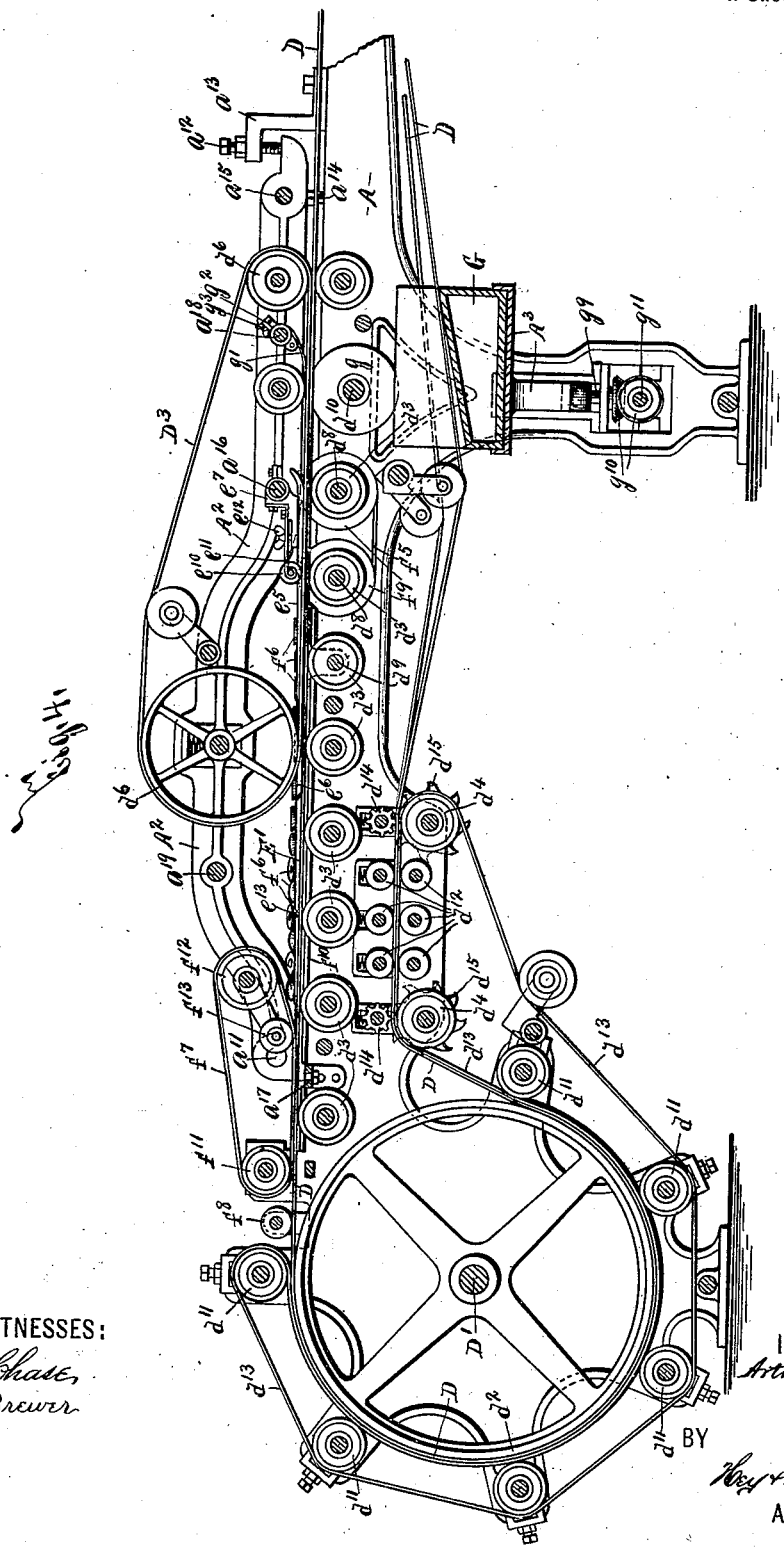
WITNESSES:
INVENTOR
Arthur B. Cowles.
BY
ATTORNEYS.

No. 654,136. Patented July 24, 1900.
A. B. COWLES.
PAPER BOX MACHINE.
(Application filed Apr. 20, 1897.)
(No Model.) 11 Sheets—Sheet 4.
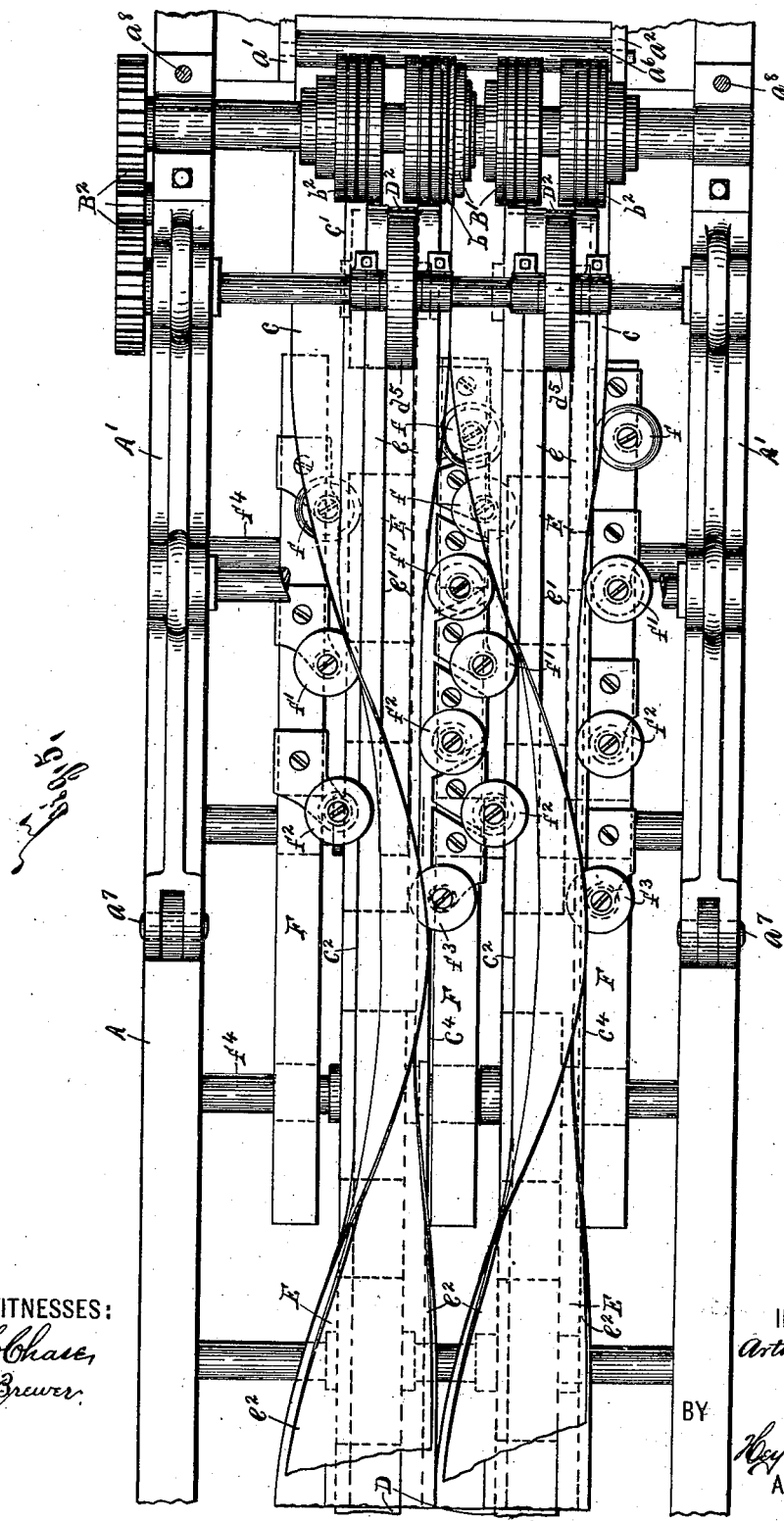
WITNESSES:
H. E. Chase,
F. F. Brewer.
INVENTOR
Arthur B. Cowles,
BY
Hay & Parsons
ATTORNEYS.

No. 654,136. Patented July 24, 1900.
A. B. COWLES.
PAPER BOX MACHINE.
(Application filed Apr. 20, 1897.)
(No Model.) 11 Sheets—Sheet 5.
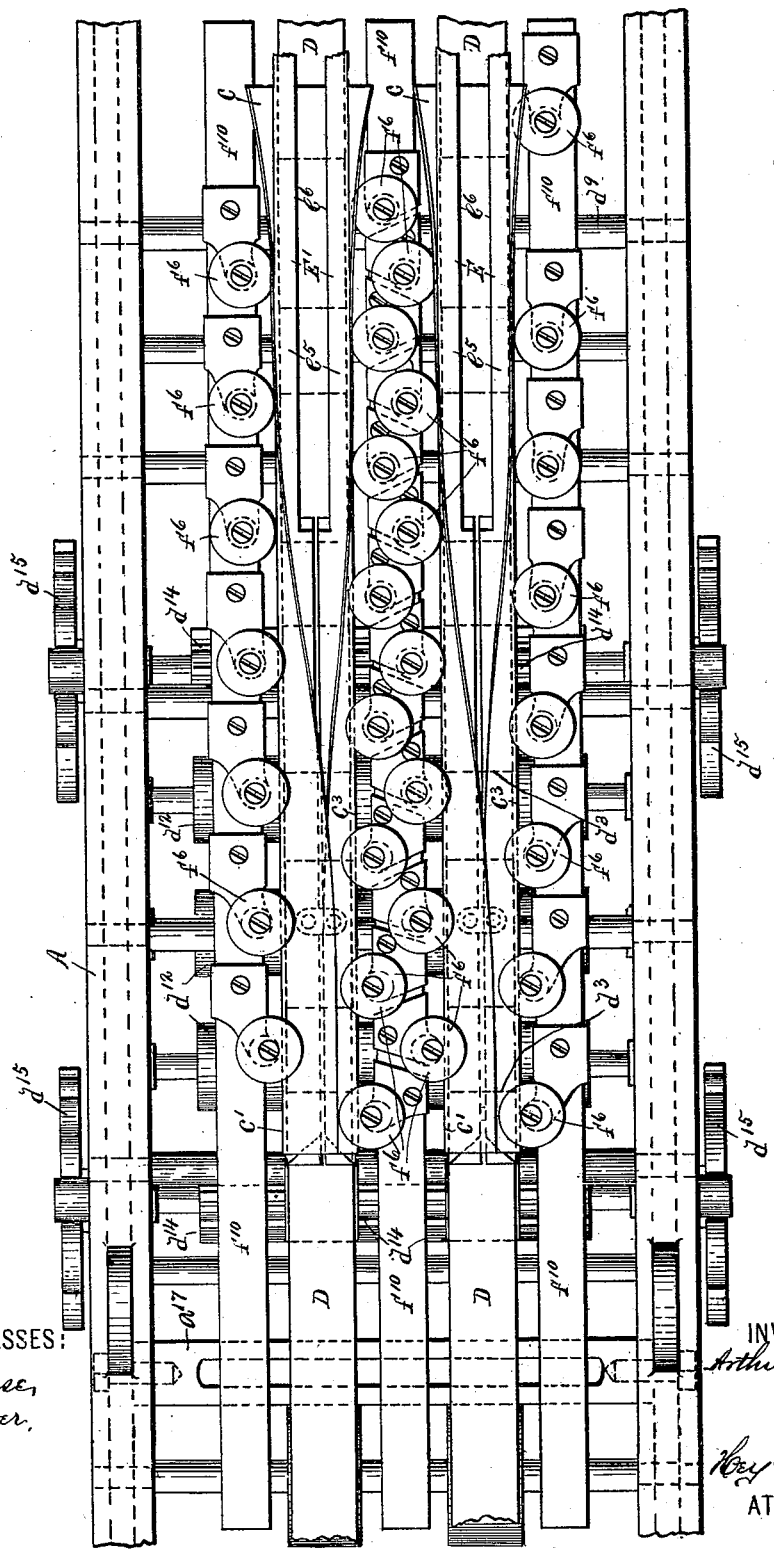
WITNESSES: INVENTOR
Arthur B. Cowles
by
ATTORNEYS

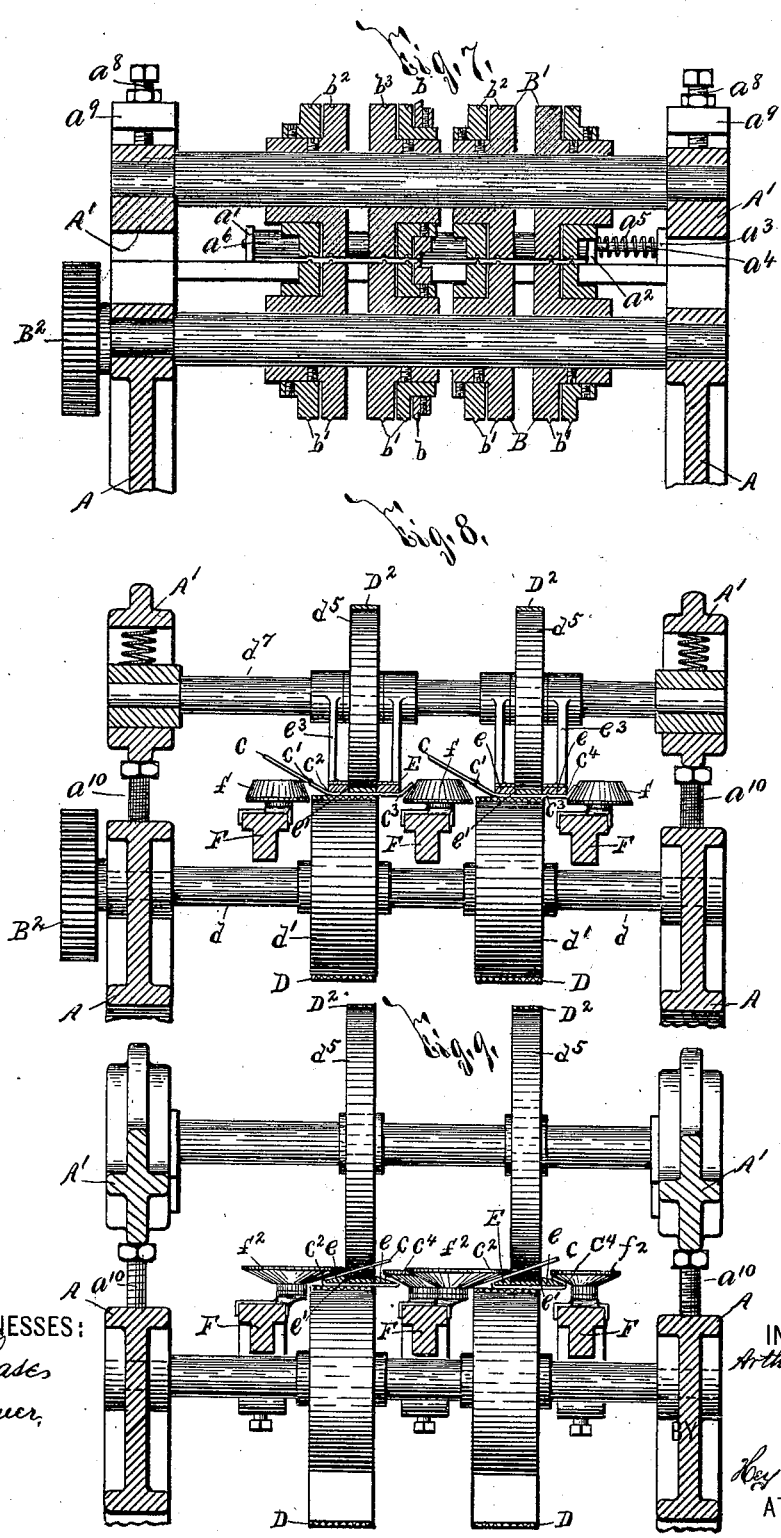

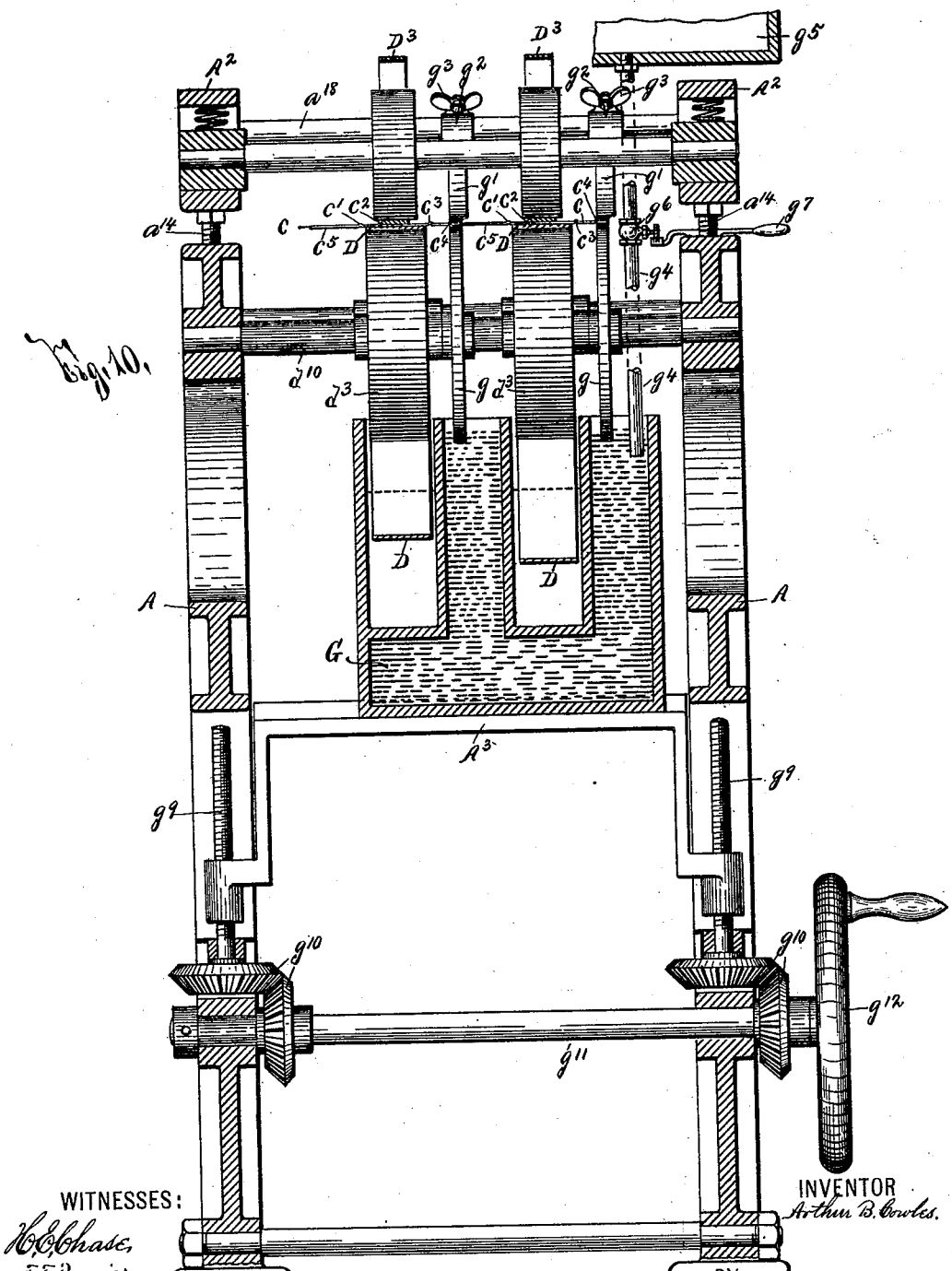

No. 654,136. Patented July 24, 1900.
A. B. COWLES.
PAPER BOX MACHINE.
(Application filed Apr. 20, 1897.)
(No Model.) 11 Sheets—Sheet 8.
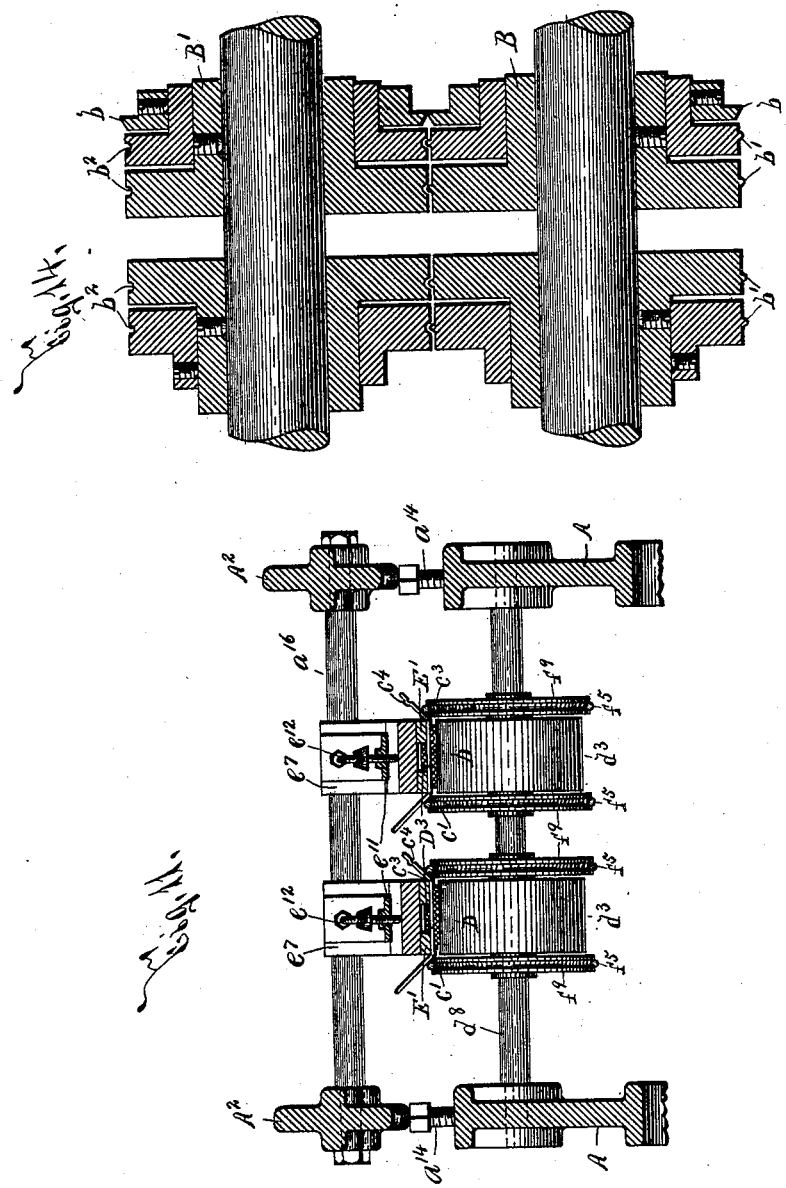
WITNESSES:
H. E. Chase,
M. D. Lewis.
INVENTOR
Arthur B. Cowles
BY
Hay & Parsons
ATTORNEYS.

No. 654,136. Patented July 24, 1900.
A. B. COWLES.
PAPER BOX MACHINE.
(Application filed Apr. 20, 1897.)
(No Model.) 11 Sheets—Sheet 9.
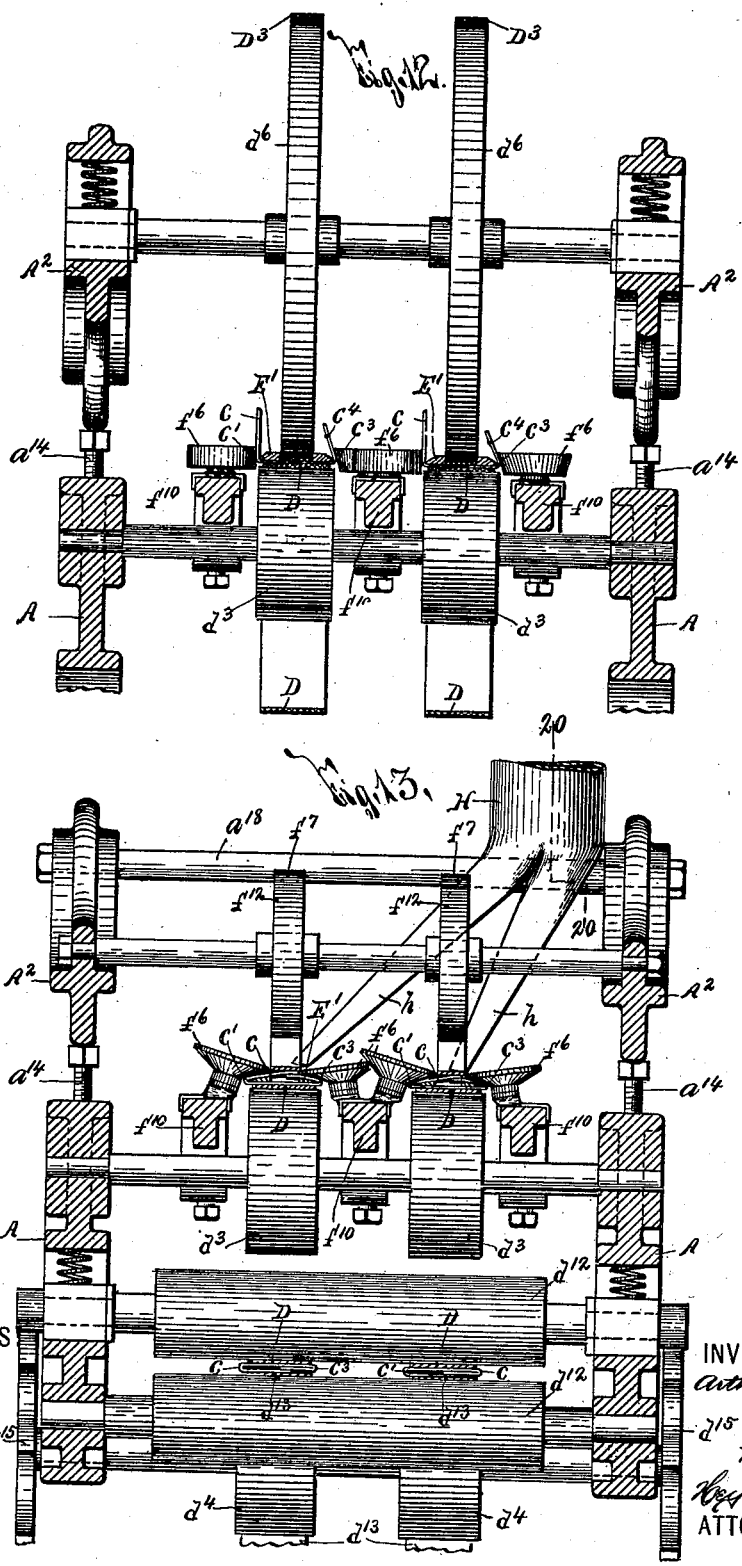
WITNESSES
H. E. Chase,
F. F. Brewer.
INVENTOR
Arthur B. Cowles
By
ATTORNEYS.

No. 654,136. Patented July 24, 1900.
A. B. COWLES.
PAPER BOX MACHINE.
(Application filed Apr. 20, 1897.)
(No Model.) 11 Sheets—Sheet 10.
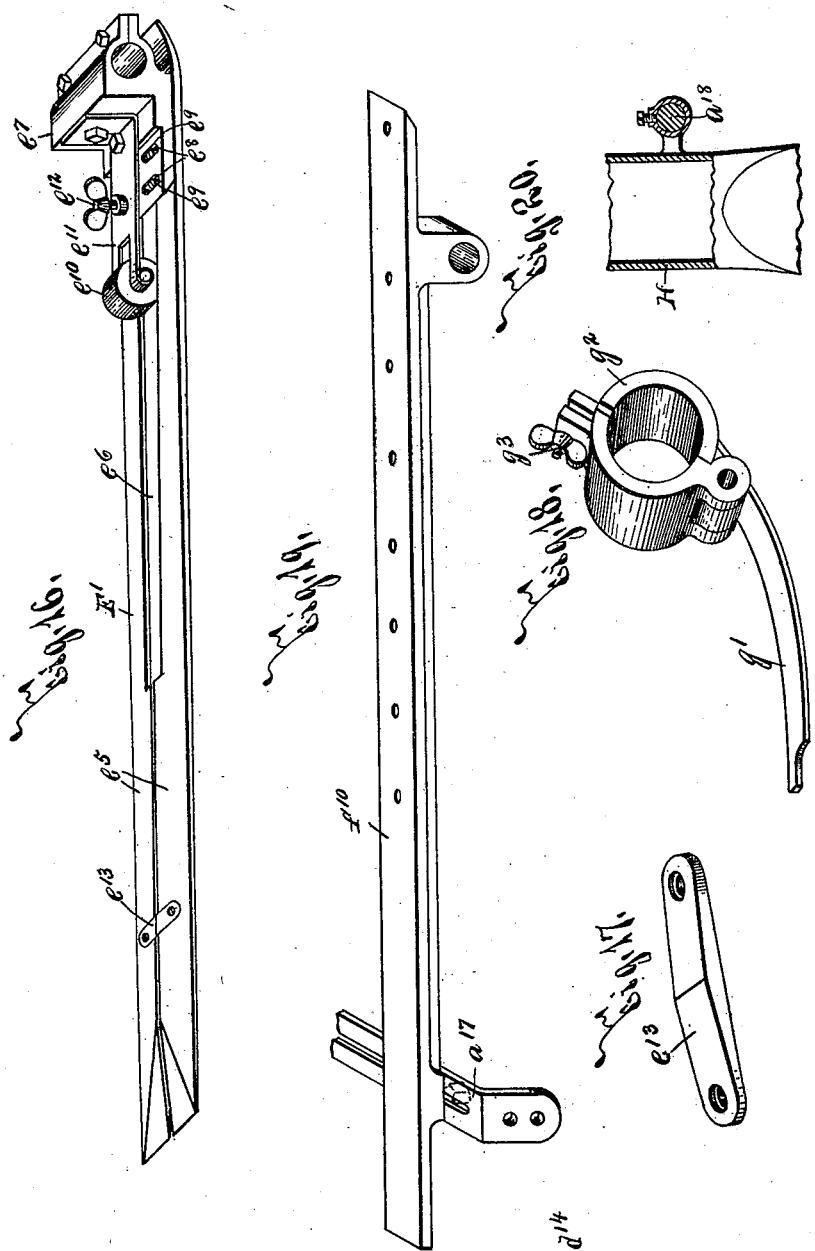
WITNESSES:
INVENTOR
Arthur B. Cowles
BY
ATTORNEYS No. 654,136. Patented July 24, 1900.
A. B. COWLES.
PAPER BOX MACHINE.
(Application filed Apr. 20, 1897.)
(No Model.) 11 Sheets—Sheet 11.
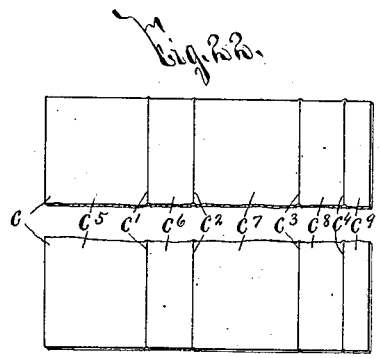
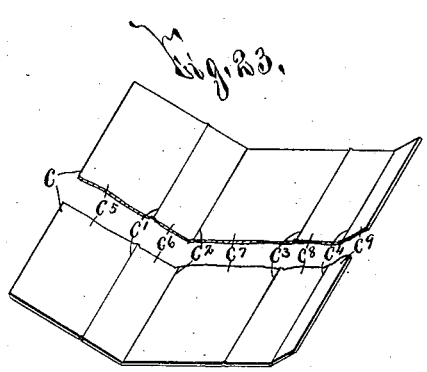
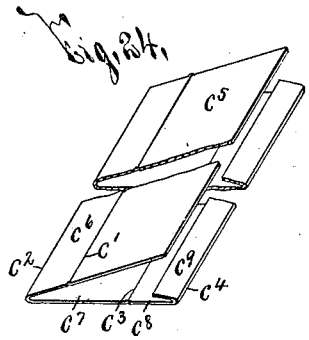
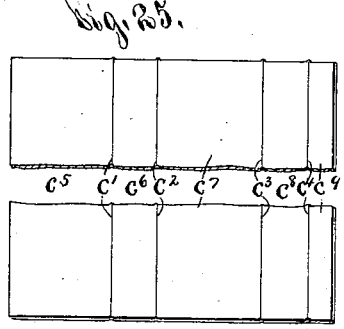
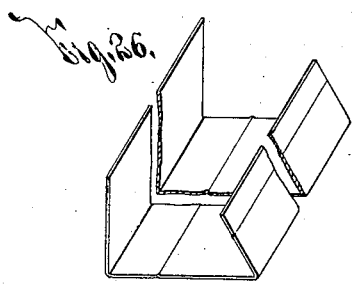
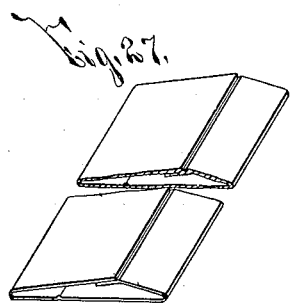
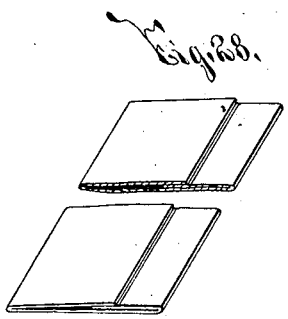
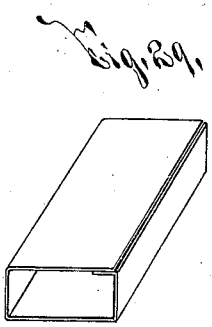
WITNESSES:
H. C. Chase,
F. F. Brewer.
INVENTOR
Arthur B. Cowles.
BY
Hey & Parsons,
ATTORNEYS.

UNITED STATES PATENT OFFICE.

ARTHUR B. COWLES, OF ROCHESTER, NEW YORK, ASSIGNOR, BY DIRECT AND MESNE ASSIGNMENTS, TO THE ROCHESTER FOLDING BOX COMPANY, OF SAME PLACE, AND WM. HENRY MAULE, OF PHILADELPHIA, PENNSYLVANIA.

PAPER-BOX MACHINE.

SPECIFICATION forming part of Letters Patent No. 654,136, dated July 24, 1900.

Application filed April 20, 1897. Serial No. 632,906. (No model.)

*To all whom it may concern:*

Be it known that I, ARTHUR B. COWLES, of Rochester, in the county of Monroe, in the State of New York, have invented new and useful Improvements in Paper-Box Machines, of which the following, taken in connection with the accompanying drawings, is a full, clear, and exact description.

My invention relates to improvements in machines particularly applicable for making the exteriors or shells of sliding boxes, as cigarette-boxes, and has for its object the production of a machine for the desired purpose, which operates with great rapidity, is particularly simple in construction, and is highly efficient in use; and to this end the invention consists in the combination, construction, and arrangement of the component parts of a paper-box machine, all as hereinafter fully described, and pointed out in the claims.

In describing this invention reference is had to the accompanying drawings, forming a part of this specification, in which like letters indicate corresponding parts in all the views.

Figures 1 and 2 are respectively side elevation and top plan of my improved paper-box machine. Figs. 3 and 4 are vertical sections taken, respectively, on lines 3 3 and 4 4, Fig. 2. Fig. 5 is a top plan view, partly broken away, of a portion of the front end of my improved paper-box machine, showing the upper cutting and scoring roller, the formers and bending means adjacent to said roller, and a pair of blanks operatively engaged by said formers and bending means. Fig. 6 is a top plan view, partly broken away, of a portion of the central or intermediate part of said paper-box machine, showing the rear formers and bending means and a pair of blanks operatively engaged by said formers and bending means. Figs. 7, 8, 9, 10, 11, 12, and 13 are vertical sections, partly in elevation, taken, respectively, on lines 7 7, 8 8, 9 9, 10 10, 11 11, 12 12, and 13 13, Fig. 1. Fig. 14 is an enlarged vertical section, partly in elevation, of portions of the cutting and scoring rollers of my improved paper-box machine. Figs. 15 and 16 are isometric views of the detached front and rear formers of my improved machine. Fig. 17 is an isometric view of the tie-piece for the lengthwise bars or divisions of the rear former. Fig. 18 is an isometric view of the presser-piece for forcing the blanks into engagement with the glue-applying wheel and the clamp or holder for securing said presser-piece in position. Fig. 19 is an isometric view of one of the detached lengthwise bars arranged at the side of the rear former for supporting the bending means coöperating with said former, a portion of one of the crosswise bars upon which said lengthwise bar is mounted being also illustrated. Fig. 20 is a vertical section taken on line 20 20, Fig. 13. Fig. 21 is an enlarged section of one of the detached presser-pieces for hammering or pressing together the glued portions of the blanks. Figs. 22, 23, 24, 25, 26, 27, and 28 are isometric views of one of the blanks, partly broken away, fed through my improved machine and formed thereby into a tubular shell, these views showing the various manipulations of the blank; and Fig. 29 is an isometric view of a portion of one of said shells bent into its usual form.

The main frame A of my improved paper-box machine may be of any desirable form, size, and construction and is usually provided at its front end with suitable cutting and scoring rollers B B' and a support $a$, which is arranged at one side of the rollers B B' and supports the blanks or other articles fed to said rollers. These blanks or other articles are arranged between guide-rails or gages $a'$ $a^2$, mounted upon the support $a$. One of the guide-rails or gages, as the one $a^2$, is generally adjustable automatically toward and away from the other guide-rail or gage and is preferably guided in its movement by arms $a^3$, which project laterally from its outer face. The arms $a^3$ are movable in bearings $a^4$, rising from the main frame A, and are encircled by springs $a^5$, which yieldingly force the guide-rail or gage $a^2$ toward the opposite guide-rail or gage $a'$. The ends of the guide-rails or gages $a'$ $a^2$ usually support a guide-roller $a^6$, arranged in close proximity to the cutting and scoring rollers B B' and having its opposite ends formed with trunnions journaled in the adjacent ends of said guide-rails or gages. As best seen at Fig. 2, the trunnion of the roller $a^6$, journaled in the guide-rail or gage $a^2$, is of considerable length in order to obviate disengagement of said trunnion from the guide-rail or gage $a^2$.

The cutting and scoring rollers B B' may be of any suitable form, size, and construction and are preferably arranged one above the other. The lower roller B is usually journaled in fixed bearings provided upon the main frame A and is preferably driven positively by gearing $B^2$, Fig. 2, which connects the shaft of said roller to an adjacent shaft $d$, presently described. The upper roller B' is generally driven frictionally by engagement with the blanks or other articles passed between the rollers B B' and is supported in bearings provided upon one extremity of a movable frame A', having its opposite extremity flexibly connected by pivots $a^7$ to the main frame A. A suitable adjuster $a^8$ is engaged with the free extremity of the movable frame A' for varying the position of said movable frame and forcing the roller B' and a feed presently described toward the roller B and the blanks or other articles engaged by said rollers B B'. The adjuster $a^8$ is usually supported in a bracket $a^9$, rising from the frame A, and as the movable frame A' is generally composed of substantially-parallel bars arranged on opposite sides of the path of movement of the blanks or other articles, as best seen at Fig. 2, I preferably use two adjusters $a^8$ and two brackets $a^9$ for supporting said adjusters. I generally limit the downward movement of the free end of the frame A' by a suitable longitudinally-adjustable stop $a^{10}$, Fig. 1, which is secured to the main frame A. The movable frame A' forms a particularly practical and effective means for supporting the roller B'; but it is obvious that any other suitable frame may be used for this purpose, if desired.

Each of the rollers B B' is usually provided with a cutting-knife $b$, and these cutting-knives are arranged to split lengthwise a blank or other article fed to the rollers B B', and thus form two blanks $c\ c$, Fig. 5, arranged side by side, in order that two box exteriors or shells may be made side by side at the same time by my improved machine. If, however, the blanks or other articles are first cut to the desired width, no cutting-knives $b$ upon the rollers B B' are necessary. The scoring-knives $b'$ of the rollers B B' are preferably provided upon the lower roller B and enter annular grooves $b^2$ in the upper roller B'. Said scoring-knives are generally arranged so as to provide the blanks or other articles $c$ with lengthwise scores or creases $c'\ c^2\ c^3\ c^4$, which divide said blanks into lengthwise portions $c^5\ c^6\ c^7\ c^8\ c^9$, as best seen at Figs. 22 and 25. The lengthwise portions $c^6\ c^8$ of the blanks $c$ are of substantially the same width as each other and are of less width than the lengthwise portions $c^5\ c^7$, which are also of substantially the same width as each other. In the operation of my improved machine, as will be hereinafter described, the outer portions of the blanks $c$ are bent upwardly from the creases or scores $c'\ c^2\ c^3\ c^4$, glue is applied to the lengthwise portions $c^9$, and said lengthwise portions $c^9$ are folded beneath the outer parts of the lengthwise portions $c^5$. It is obvious, however, that the blanks $c$ may be provided with a greater or less number of lengthwise scores or creases and may be otherwise operated upon by my improved machine, if desired.

The blanks $c$ fed between the rollers B B' are engaged by a suitable feed extending lengthwise of the main frame A from a point in close proximity to said rollers. This feed may be of any desirable form, size, or construction and usually consists of endless belts D, having their front ends passed over pulleys $d'$ on the shaft $d$, previously mentioned, and their opposite ends passed over a drum $d^2$, suitably connected to a driving-shaft D'. The upper and lower portions of the belts D D, interposed between the pulleys $d'$ and the drum $d^2$, are respectively supported by upper and lower idlers $d^3\ d^4$. The upper portions of the belts D engage only the lower faces of the blanks or other articles fed from the rollers B B', and consequently I preferably provide my improved machine with suitable additional feeds, which engage the upper faces of said blanks or other articles and usually consist of endless belts $D^2\ D^3$, arranged in pairs one in advance of the other. The belts $D^2$ are generally passed over pulleys $d^5$, which are journaled in yielding bearings supported by the movable frame A', and the belts $D^3$ are passed over pulleys $d^6$, journaled in yielding bearings supported by a movable frame $A^2$, arranged at the rear of the frame A'. The movable frame $A^2$ preferably consists of parallel bars arranged at opposite sides of the path of movement of the blanks or other articles fed through my improved paper-box machine. The rear ends of said bars are usually flexibly connected to the main frame A by pivots $a^{11}$, and their front ends are forced toward the belts D and the blanks or other articles $c$ by suitable adjusters $a^{12}$, which are preferably mounted in brackets $a^{13}$, rising from the frame A. Suitable stops $a^{14}$, similar to the stops $a^{10}$, previously described, are generally utilized to limit the downward movement of the free end of the frame $A^2$. The described means for feeding the blanks or other articles $c$ is particularly practical and effective; but other suitable devices may be used for this purpose, if desired. During the engagement of the blanks or other articles $c$ by the belts D $D^2\ D^3$ suitable means operate to bend the outer portions of said blanks upwardly from their lengthwise scores or creases $c'\ c^2\ c^3\ c^4$ and fold the same upon formers E E', arranged in pairs, one in advance of the other, in proximity to the belts $D^2\ D^3$.

Each of the formers E, as best seen at Figs. 2, 5, and 15, is arranged in close proximity to the cutting and scoring rollers B B', and preferably consists of lengthwise bars or divisions $e\,e$, arranged side by side and adjustable laterally toward and away from each other. The front extremities of the inner or adjacent portions of the bars $e\,e$ are generally provided with longitudinal cut-outs $e'$, which form lengthwise slots in the formers E, and the outer side edges of said bars $e$ are usually formed with diverging portions $e^2$. The front and rear ends of the bars $e\,e$ are provided with upwardly-projecting arms $e^3\,e^4$, secured, respectively, by suitable fastening means to the shaft $d^7$ for one of the pulleys $d^5$ and to a transverse rod or bar $a^{15}$. The shaft $d^7$ and the rod or bar $a^{15}$ are generally supported by the front or free ends of the movable frames A' A$^2$, and consequently the formers E are secured to said frames. The adjusters $a^8\,a^{12}$ thus operate to vary the position of the formers E. The cut-outs $e'$ in the formers E receive the belts D$^2$ and permit said belts to engage the blanks or other articles passed beneath said formers.

The means for bending the blanks or other articles $c$ at their lengthwise scores or creases $c^2\,c^4$ and folding said blanks or other articles upon the formers E preferably consists of rollers $f\,f'\,f^2\,f^3$, which are arranged at the outer side edges of the bars or divisions $e\,e$ in advance of the diverging portions $e^2$ thereof. The rollers $f\,f'\,f^2\,f^3$ are usually formed with engaging surfaces, which are arranged at different angles to the side edges of the formers E, and a number of said rollers are supported at the rear of the belts D$^2$. Some of the rollers $f\,f'\,f^2\,f^3$ bend the outer portions of the blanks $c$ upwardly from the scores or creases $c^2\,c^4$ at opposite sides of the belts D$^2$, as best seen at Figs. 8 and 23, and others of said rollers fold the upwardly-bent portions of the blanks upon the formers E at the rear of the belts D$^2$, as best seen in Figs. 5, 9, and 24. The rearwardly-diverging portions $e^2$ of the outer side edges of the formers E then reversely bend the outer side portions of said blanks, as best seen at Figs. 10 and 25. The rollers $f\,f'\,f^2\,f^3$ are preferably journaled in yielding arms or portions of suitable suports secured to bars F, adjustable laterally toward and away from the longitudinal edges of the formers E. The bars F are generally provided with depending eyes, which are movable lengthwise of bars $f^4$, extending crosswise of the belts D, and are secured in position by suitable set-screws engaged with said bars $f^4$.

The formers E', Figs. 2, 4, and 16, are supported at the rear of the formers E and are usually so arranged that their engaging or outer side edges are out of alinement with the similar edges of the formers E in order to facilitate the bending of the blanks or other articles $c$ at the scores or creases $c'\,c^3$, as best seen at Fig. 26. Each of the formers E' preferably consists of substantially-parallel lengthwise bars or divisions $e^5\,e^5$, adjustable laterally toward and away from each other, and the front ends of the inner portions or edges of the bars or divisions $e^5\,e^5$ are generally provided with longitudinal cut-outs $e^6$, which form lengthwise slots in the formers E' for receiving the belts D$^3$ and permitting engagement of said belts with the blanks or other articles passed beneath the formers E'. The top faces of the rear ends of said bars or divisions $e^5\,e^5$ usually incline upwardly from their outer side edges, and the rear extremities of said inclined top faces incline downwardly toward the belts D. The front ends of the formers E' are provided with upwardly-extending arms $e^7$, which are adjustable lengthwise upon a transverse rod $a^{16}$, provided upon the movable frame A$^2$. The arms $e^7$ are usually formed with crosswise slots $e^8$, which receive suitable fastening means, as screws $e^9$, for securing the front extremities of the bars or divisions $e^5\,e^5$ to said arms $e^7$ and permitting the lateral adjustment of the front ends of said bars or divisions toward and away from each other. The arms $e^7$ generally support presser-rollers $e^{10}$, which project into the cut-outs $e^6$ in the inner or adjacent edges of the bars or divisions $e^5\,e^5$. These rollers $e^{10}$ are preferably secured to the arms $e^7$ by suitable fastening-pieces $e^{11}$, which are usually formed of spring metal and are engaged by adjusters $e^{12}$ for forcing the rollers $e^{10}$ toward and away from the blanks or other articles passing beneath the formers E'. The rear ends of the bars or divisions $e^5\,e^5$ of each former E' are unsupported and are secured together by tie-pieces $e^{13}$, which enter crosswise grooves in the upper faces of said rear ends. I preferably provide each former E' with a number of tie-pieces $e^{13}$ of unequal length for separating said bars any desired distance.

The means for elevating the portions of the blanks or other articles extending outwardly beyond the scores or creases $c'\,c^3$ and folding said portions of the blanks upon the formers E' preferably consist of belts $f^5$, rollers $f^6$, and presser-pieces $f^7\,f^8$. The belts $f^5$, Figs. 1, 2, and 11, are usually passed over pulleys $f^9$, mounted on the shafts $d^8\,d^8$, for two of the idlers $d^3$. The upper portions of said belts extend upwardly above the belts D in the paths of movement of the outer portions of the blanks $c$, and thus bend upwardly said outer portions, Fig. 11, and facilitate the onward feeding of the blanks $c$. The rollers $f^6$ are arranged at the rear of the belts $f^5$ and are provided with engaging faces arranged at different angles to the engaging or longitudinal outer edges of the formers E', and the engaging faces of the rear rollers $f^6$ are arranged at gradually-decreasing angles to the upper faces and the outer side edges of said formers for gradually folding the blanks upon the formers E', as best seen at Figs. 6, 12, 13, and 27. Said rollers $f^6$ are usually journaled in yielding arms or portions of suitable supports secured to bars $f^{10}$, Figs. 2 and 19, adjustable laterally toward and away from the outer side edges of the formers E'. The front ends of the bars $f^{10}$ are provided with eyes movable lengthwise of a shaft $d^9$ for one of the idlers $d^3$, and the rear ends of said bars are adjustably secured to a bar $a^{17}$, extending crosswise of the belts D.

The presser-pieces $f^7$ preferably consist of endless belts arranged in alinement with the formers E' above the belts D and extending rearwardly beyond said formers. The opposite ends of the belts forming the presser-pieces $f^7$ are usually passed over pulleys $f^{11}$ $f^{12}$, arranged one in advance of the other and supported, respectively, by the movable frame $A^2$ and arms projecting upwardly from the main frame A. The lower faces of the pulleys $f^{11}$ are generally arranged in close proximity to the belts D, and the corresponding faces of the pulleys $f^{12}$ are considerably elevated above said belts. Suitable idlers $f^{13}$ are arranged at the rear of the pulleys $f^{12}$ above the lower portions of the belts forming the presser-pieces $f^7$. The lower faces of the idlers $f^{13}$ are supported in close proximity to the belts D, and consequently the front ends of the lower portions of the belts forming the presser-pieces $f^7$ incline downwardly from the pulleys $f^{12}$ to the idlers $f^{13}$ and the belts D and operate to gradually flatten the blanks or other articles folded, as in Fig. 6, by the rollers $f^6$. As presently described, glue or paste is applied to the lengthwise portions $c^9$ of the blanks or other articles $c$ before their engagement by the presser-pieces $f^7$, and therefore by gradually flattening said blanks the glued surfaces thereof are caused to assume their proper position for forming folded blanks of uniform width. The presser-piece $f^8$ usually consists of a roller extending crosswise of the belts D at the rear of the presser-pieces $f^7$ and having its extremities journaled in arms projecting upwardly from the frame A. The presser-piece $f^8$ may, however, be dispensed with, if desired.

Before the blanks or other articles $c$ are fed beneath the formers E' a feed of any desirable construction operates to apply a suitable amount of glue or paste to the lengthwise portions $c^9$ of said blanks. The means for feeding said glue or paste preferably consists of wheels $g$, Figs. 4 and 10, which are mounted upon a shaft $d^{10}$ for one of the rollers $d^3$ and engage the under surfaces of said portions $c^9$. Suitable presser-pieces $g'$ force the blanks $c$ into engagement with the glue-applying wheels $g$ in order to insure positive feeding of the glue. These presser-pieces may be of any desirable construction, but preferably consist of spring-arms secured to supporting clamps or holders which usually consist of split eyes $g^2$, adjustable lengthwise of a rod or bar $a^{18}$, extending crosswise of the belts D. The split eyes $g^2$ are generally secured in position by screws or other fastening means $g^3$. The wheels $g$ revolve in a glue-containing receptacle G, which is preferably mounted on a movable frame $A^3$ and is supplied with glue or paste by a pipe $g^4$, depending from a superimposed glue-containing receptacle $g^5$. The pipe $g^4$ is provided with a valve $g^6$, which is operated by a handpiece $g^7$, Fig. 10. A suitable steam-pipe $g^8$, Fig. 1, enters the upper glue-containing receptacle $g^5$ and maintains the desired temperature thereof. The support $A^3$ for the glue-containing receptacle G is preferably movable lengthwise of revoluble screws $g^9$, which are connected by bevel-gears $g^{10}$ to a shaft $g^{11}$, provided with a handpiece $g^{12}$. The means for folding the blanks or other articles and applying glue or paste thereto are particularly practical and effective; but, if desired, any other suitable devices for performing these operations may be embodied in my improved machine.

In the preferable construction of my paper-box machine I use a blower H for facilitating the cooling and drying of the glue or paste applied to the blanks or other articles $c$. This blower may be of any desirable form, size, and construction and is here shown, Figs. 1 and 13, as composed of an upright tube provided with diverging ends $h$ $h$, arranged in advance of the presser-piece $f^7$ in close proximity to the rollers $f^6$. The blower H is connected to any suitable fan or other device for creating a circulation therein and is preferably supported by a rod $a^{19}$, which extends crosswise of the movable frame $A^2$ and is detachably secured to said frame by any desirable fastening means. As usually constructed the blower H is provided with an eye $h'$, Figs. 1 and 20, which is movable lengthwise of said rod $a^{19}$. The blower H by facilitating the cooling and drying of the glue applied to the blanks $c$ greatly increases the efficiency and rapidity of operation of my improved paper-box machine and is therefore a feature of considerable advantage. It is obvious, however, that said blower may be dispensed with, if desired.

After the blanks or other articles $c$ are folded, as described, they are then squeezed or subjected to pressure by any suitable means in order to insure proper adhesion of their glued or pasted surfaces. The means for squeezing the blanks may be of any desirable form, size, and construction, but preferably consists of presser-rollers $d^{11}$ $d^{12}$, belts $d^{13}$ $d^{13}$, and presser-pieces $d^{14}$. The presser-rollers $d^{11}$ are mounted in yielding bearings and are arranged one in advance of the other crosswise of the drum $d^2$. The presser-rollers $d^{12}$ are arranged between the idlers $d^4$ $d^4$ above and below the interposed portions of the belts D $d^{13}$ $d^{13}$, and the upper presser-rollers $d^{12}$ are usually mounted in yielding bearings. The belts $d^{13}$ $d^{13}$ are passed around the presser-roller $d^{11}$ nearest the presser-pieces $f^7$ $f^8$, are extended downwardly and upwardly on opposite sides of the remaining presser-rollers $d^{11}$, and are then continued forwardly beneath the lower portions of the belts D D and around the idlers $d^4\ d^4$. The presser-pieces $d^{14}$ preferably consist of revoluble toothed wheels, which are mounted in yielding bearings and operate to intermittently press or hammer the folded blanks interposed between the belts D $d^{13}\ d^{13}$. Said presser-pieces $d^{14}$ are usually raised intermittently out of operative position by suitable means, as toothed wheels $d^{15}$, mounted upon the shafts for the idlers $d^4\ d^4$ and engaged with rollers upon the ends of said presser-pieces. After the blanks are squeezed or subjected to pressure, as described, they are discharged from between the belts D $d^{13}\ d^{13}$ into a receptacle (not illustrated) and are then cut into suitable lengths, as shown in Fig. 29. The means for squeezing or exerting pressure upon the blanks $c$ is particularly applicable for use in connection with the remaining parts of my improved paper-box machine; but any other suitable means may be used for this purpose.

The construction of my improved paper-box machine will now be readily understood upon reference to the foregoing description and the accompanying drawings. In the operation of said machine the blanks are placed upon the support $a$, between the guide-rails or gages $a'\ a^2$, and are fed between the cutting and scoring rollers B B′, which divide said blanks into lengthwise blanks $c$ and provide the blanks $c$ with lengthwise scores or creases $c'\ c^2\ c^3\ c^4$. The blanks $c$ are passed beneath the formers E and are engaged by the rollers $f\ f'\ f^2\ f^3$, which bend the outer portions of said blanks upwardly from the scores or creases $c^2\ c^4$ and fold the same upon the front ends of the formers E. The diverging portions of the outer side edges of the formers E depress the upwardly-folded portions of the blanks $c$, and glue or paste is then applied to the lengthwise portions $c^9$ of said blanks, whereupon the blanks are passed beneath the formers E′. The belts $f^5$ and the rollers $f^6$ bend the outer portions of the blanks $c$ upwardly from the scores or creases $c'\ c^3$ and fold the same upon the formers E′. The blower H cools and partially dries the glue applied to the blanks $c$, and the presser-pieces $f^7\ f^8$ additionally fold or flatten the blanks $c$, whereupon said blanks are squeezed between the drum $d^2$, presser-rollers $d^{11}\ d^{12}$, idlers $d^4$, and presser-pieces $d^{14}$ and are discharged from the machine.

It is obvious, as previously indicated, that the exact detail construction and arrangement of the component parts of my improved paper-box machine may be considerably varied without departing from the spirit of my invention, and hence I do not herein specifically limit myself to such exact detail construction and arrangement.

Having thus fully described my invention, what I claim as new, and desire to secure by Letters Patent, is—

1. In combination, a roller provided with a knife, a support for the articles fed to the roller, a pair of guide-rails or gages leading to the roller, one of the guide-rails or gages having arms projecting laterally from its outer face, bearings mounted upon the support for receiving the arms, springs encircling the arms for automatically forcing the guide-rail or gage provided with said arms toward the other guide-rail or gage, and a second roller supported by the guide-rails or gages in proximity to the first roller, substantially as and for the purpose set forth.

2. In combination, a roller provided with a knife, a pair of guide-rails or gages leading to the roller, one of the guide-rails or gages being automatically adjustable toward and away from the other, and a second roller supported by the guide-rails or gages in proximity to the first roller, substantially as and for the purpose specified.

3. In combination, a main frame, a pair of rollers, one of which is provided with a knife for engaging the articles fed to the rollers, a movable frame having one end flexibly connected to the main frame and its opposite end provided with a bearing for one of the rollers, a feed supported by the movable frame for feeding the articles engaged by said knife, and an adjuster for varying the position of the movable frame and forcing the feed and the roller supported by the movable frame toward the articles fed to said roller, substantially as and for the purpose specified.

4. In combination, a pair of rollers, one of which is provided with a knife for engaging the articles fed to the rollers, a main frame having a support arranged at one side of the rollers for supporting the blanks or other articles to be fed thereto, a pair of guide-rails or gages mounted on the support, one of the guide-rails or gages being adjustable toward and away from the other, an additional roller supported by the guide-rails or gages in proximity to the pair of rollers, a movable frame extending beyond the opposite side of said pair of rollers and having one extremity flexibly connected to the main frame and its opposite extremity provided with a bearing for one of said pair of rollers, and an adjuster for varying the position of the movable frame and forcing the roller supported thereby toward the articles fed to said roller, substantially as and for the purpose set forth.

5. In combination, a pair of rollers, one of which is provided with a knife for engaging the articles fed to the rollers, a main frame having a support arranged at one side of the rollers for supporting the articles to be fed thereto, a pair of guide-rails or gages mounted on the support, one of the guide-rails or gages being adjustable toward and away from the other, an additional roller supported by the guide-rails or gages in proximity to the pair of rollers, a movable frame extending beyond the opposite side of said pair of rollers and having one extremity flexibly connected to the main frame and its opposite extremity provided with a bearing for one of said pair of rollers, a feed secured to the movable frame for feeding the articles engaged by said pair of rollers, and an adjuster for varying the position of the movable frame and forcing the roller supported thereby toward the articles fed to said roller, substantially as and for the purpose described.

6. In combination, a pair of rollers, one of which is provided with a knife, a main frame having a support arranged at one side of the rollers for supporting the articles to be fed thereto, a movable frame extending beyond the opposite side of the rollers and having one extremity flexibly connected to the main frame and its opposite extremity provided with a bearing for one of the rollers, and a feed secured to the movable frame for feeding the articles engaged by said knife, substantially as and for the purpose described.

7. In combination, a pair of rollers, one of which is provided with a knife, a main frame having a support arranged at one side of the rollers for supporting the articles to be fed thereto, a movable frame extending beyond the opposite side of the rollers and having one extremity flexibly connected to the main frame and its opposite extremity provided with a bearing for one of the rollers, a feed secured to the movable frame for feeding the articles engaged by said knife, and an adjuster for varying the position of the movable frame and forcing the roller supported thereby toward the articles fed to said roller, substantially as and for the purpose set forth.

8. In combination, a pair of rollers, one of which is provided with a knife, a main frame, a movable frame flexibly connected to the main frame and provided with a bearing for one of the rollers, a feed secured to the movable frame for feeding the articles fed to the rollers, an adjuster for varying the position of the movable frame and forcing the feed and the roller supported by the movable frame toward the articles fed to the rollers, and means for bending said articles during the engagement of the feed therewith, substantially as and for the purpose specified.

9. In combination, a pair of rollers, one of which is provided with a knife, a main frame having a support for the articles fed to the rollers, a movable frame having one extremity flexibly connected to the main frame and its opposite extremity provided with a bearing for one of the rollers, a feed secured to the movable frame for feeding said articles, an adjuster for varying the position of the movable frame and forcing the feed and the roller supported by the movable frame toward the articles fed to the rollers, and means arranged beneath the movable frame for bending said articles, substantially as and for the purpose set forth.

10. In combination, a pair of rollers, one of which is provided with a knife, a main frame having a support arranged at one side of the rollers for supporting the articles to be fed thereto, a movable frame extending beyond the opposite side of the rollers and having one extremity flexibly connected to the main frame and its opposite extremity provided with a bearing for one of the rollers, an adjuster for varying the position of the movable frame and forcing the roller supported thereby toward the other roller, a feed secured to the movable frame for feeding the articles fed to the rollers, and means arranged in proximity to the feed for bending said articles, substantially as and for the purpose described.

11. In combination, a roller provided with a knife, a main frame having a support for the articles fed to the roller, a movable frame connected to the main frame, a feed secured to the movable frame for engaging corresponding faces of said articles, an adjuster for varying the position of the movable frame and forcing the feed into its operative position, a second feed for engaging the opposite faces of the articles fed to the roller, and additional rollers supported adjacent to the feeds for engaging and bending said articles when engaged by the former feeds, substantially as and for the purpose specified.

12. In combination, a pair of rollers, one of which is provided with a knife, a frame having a support arranged at one side of the rollers for supporting the articles to be fed thereto, a movable frame extending beyond the opposite side of the rollers and having one extremity flexibly connected to the main frame and its opposite extremity provided with a bearing for one of the rollers, a feed secured to the movable frame for engaging corresponding faces of said articles, an adjuster for varying the position of the movable frame and forcing said feed and the roller supported by the movable frame toward the articles fed to the rollers, a second feed for engaging the opposite faces of the articles fed to the rollers, and additional rollers supported adjacent to the feeds for bending the articles fed to the former rollers, substantially as and for the purpose described.

13. In combination, a main frame, a pair of rollers, one of which is provided with a knife, a movable frame connected to the main frame and provided with a bearing for one of the rollers, a former secured to the movable frame, a feed for feeding the blanks or other articles, and means for bending said blanks or other articles upon the former, substantially as and for the purpose specified.

14. In combination, a main frame, a pair of rollers one of which is provided with a knife, a movable frame connected to the main frame and provided with a bearing for one of the rollers a feed secured to the movable frame for feeding the blanks or other articles fed to the rollers, a former secured to the movable frame, and means for bending said blanks or other articles upon the former, substantially as and for the purpose set forth.

15. In combination, a pair of rollers, one of which is provided with a knife, a main frame having a support arranged at one side of the rollers for supporting the blanks or other articles to be fed thereto, a movable frame extending beyond the opposite side of the rollers and having one extremity flexibly connected to the main frame and its opposite extremity provided with a bearing for one of the rollers, a feed secured to the movable frame for engaging the articles fed to the rollers, an adjuster for varying the position of the movable frame and forcing said feed and the roller supported by the movable frame toward the articles fed to the rollers, a former for engaging the blanks or other articles after their passage between the rollers, a portion of said former being provided with diverging edges, and means for bending the blanks or other articles upon the former in advance of its diverging edges, substantially as and for the purpose specified.

16. In combination, a main frame, a feed for engaging corresponding faces of the blanks or other articles, a former for engaging the opposite faces of the blanks or other articles, means for supporting one end of the former, a movable frame flexibly connected to the main frame and connected to the opposite end of the former, and an adjuster for varying the position of the movable frame, substantially as and for the purpose set forth.

17. In combination, a pair of rollers, one of which is provided with a knife, a main frame having a support arranged at one side of the rollers, for supporting the blanks or other articles to be fed thereto, a movable frame extending beyond the opposite side of the rollers and having one extremity flexibly connected to the main frame and its opposite extremity provided with a bearing for one of the rollers, an adjuster for varying the position of the movable frame and forcing the roller supported thereby toward the other roller, a feed for engaging corresponding faces of the blanks or other articles, a former for engaging the opposite faces of the blanks or other articles, said former having its advance end connected to the movable frame, and means for supporting the opposite end of the former, substantially as and for the purpose described.

18. In combination, a main frame, a feed for engaging the blanks or other articles, a former, movable frames arranged one in advance of the other and having corresponding ends flexibly connected to the main frame and their opposite ends connected to the extremities of the former, and means for bending said blanks or other articles upon the former, substantially as and for the purpose specified.

19. In combination, a main frame, a pair of rollers, one of which is provided with a knife, a movable frame flexibly connected to the main frame and provided with a bearing for one of the rollers, a feed secured to the movable frame for feeding the blanks or other articles, an adjuster for varying the position of the movable frame and forcing the feed and the roller supported by the movable frame toward the articles fed to the rollers, a former for engaging the blanks or other articles, a portion of said former being provided with diverging edges, and a series of rollers arranged one in front of the other in advance of the diverging edges of the former for bending said blanks or other articles upon the former, said rollers being provided with engaging faces disposed at different angles to the adjacent longitudinal edges of the former, substantially as and for the purpose set forth.

20. In combination, a feed for the blanks or other articles, a former for engaging the blanks or other articles, said former being provided with a lengthwise slot and having one of its outer side edges formed with an outwardly-extending portion for forcing outwardly parts of the blank or other articles, a second feed consisting of an endless belt movable within the lengthwise slot of the former for feeding the blanks or other articles, and a series of rollers arranged adjacent to said one of the outer side edges of the former in advance of the outwardly-extending portion thereof and having engaging faces disposed at different angles to said outer side edge for bending the blanks or other articles upon the former, some of said rollers being arranged at the rear of the second feed, substantially as and for the purpose described.

21. In combination, a pair of rollers, one of which is provided with a knife, a main frame, a movable frame connected to the main frame and provided with a bearing for one of the rollers, a former for engaging the blanks or other articles, said former being provided with a lengthwise slot, a feed supported by the movable frame and movable within the lengthwise slot of the former for feeding the blanks or other articles, an adjuster for varying the position of the movable frame and forcing the feed and the roller supported by the movable frame toward the blanks or other articles, and a series of rollers arranged at opposite sides of the former and having engaging faces disposed at different angles to the adjacent longitudinal edges of the former for bending the blanks or other articles upon the former, substantially as and for the purpose specified.

22. In combination, a main frame, a feed for the blanks or other articles, a movable frame secured to the main frame, a former for engaging the blanks or other articles, said former being secured to the movable frame and provided with a lengthwise slot and having its outer side edges formed with diverging portions for forcing parts of the blanks or other articles outwardly from each other, a second feed supported by the movable frame and movable within the lengthwise slot of the former for feeding the blanks or other articles, means for varying the position of the movable frame, and a series of rollers arranged at opposite sides of the former in advance of the diverging portions of its outer side edges and having engaging faces disposed at different angles to the adjacent longitudinal edges of the former for bending the blanks or other articles upon the former, substantially as and for the purpose set forth.

23. In combination, a feed for the blanks or other articles, a former for engaging the blanks or other articles, a portion of said former being provided with diverging edges, a series of rollers for bending said blanks or other articles upon the former in advance of its diverging edges, and supports for the rollers having yielding arms or portions connected to said rollers, substantially as and for the purpose specified.

24. In combination, a feed for the blanks or other articles, a former for engaging the blanks or other articles, said former being provided with a lengthwise slot and diverging edges, a second feed movable within the lengthwise slot of the former in advance of its diverging edges for feeding the blanks or other articles, and a series of rollers arranged at opposite sides of the former in advance of its diverging edges and provided with engaging faces disposed at different angles to the adjacent longitudinal edges of the former for bending said blanks or other articles upon the former, some of said rollers being arranged at the rear of the second feed, substantially as and for the purpose specified.

25. In combination, a former for engaging the blanks or other articles, said former consisting of lengthwise bars or divisions having their outer side edges formed with diverging portions, for forcing parts of the blanks or other articles outwardly from each other and having their inner side portions provided with longitudinal cut-outs, one of said bars or divisions being adjustable toward and away from the other bar or division, a feed movable in said cut-outs for engaging the blanks or other articles, and means for bending said blanks or other articles upon the former in advance of the diverging portions of its outer side edges, substantially as and for the purpose set forth.

26. In combination, a feed for the blanks or other articles, a former for engaging the blanks or other articles, said former consisting of lengthwise bars or divisions having their outer side edges formed with diverging portions for forcing parts of the blanks or other articles outwardly from each other and having their inner side portions formed with longitudinal cut-outs, one of said bars or divisions being adjustable toward and away from the other bar or division, a second feed movable within the longitudinal cut-outs of the bars or divisions of the former, and rollers arranged at opposite sides of the former in advance of its diverging edges and provided with engaging faces disposed at different angles to the adjacent longitudinal edges of the former for bending said blanks or other articles upon the former in advance of the diverging portions of its outer side edges, substantially as and for the purpose described.

27. In combination, a main frame, a feed for the blanks or other articles, a movable frame supported by the main frame, means for varying the position of the movable frame, a former consisting of separated substantially-parallel lengthwise bars or divisions having their front ends secured to the movable frame and provided with longitudinal cut-outs in their inner side portions, one of the bars or divisions being adjustable laterally toward and away from the other bar or division, a tie-piece having its opposite ends secured to the rear ends of said bars or divisions, a second feed movable within the longitudinal cut-outs of the bars or divisions, and means for bending the blanks or other articles upon the former, substantially as and for the purpose specified.

28. In combination, a feed for the blanks or other articles, a former consisting of separated substantially-parallel lengthwise bars or divisions one of which is adjustable toward and away from the other, a tie-piece having its opposite ends secured to the bars or divisions for holding the same in their adjusted position, the top faces of the bars or divisions being inclined upwardly from their outer side edges, and a series of rollers arranged one in front of the other for bending the blanks or other articles upon the former, said rollers being provided with engaging faces disposed at gradually-decreasing angles to the top faces of the bars or divisions of the former, substantially as and for the purpose set forth.

29. In combination, a feed for the blanks or other articles, a former, a belt arranged at one side of the former for elevating the adjacent portions of the blanks or other articles, and rollers arranged at the rear of the belt for bending the elevated portion of the blanks or other articles upon the former, substantially as and for the purpose described.

30. In combination, a feed for the blanks or other articles, a former, belts arranged at opposite sides of the former for elevating the sides of the blanks or other articles, and rollers arranged one in front of the other at opposite sides of the former and at the rear of the belts for bending the blanks, said rollers being provided with engaging faces disposed at gradually-decreasing angles to the upper face of the former, substantially as and for the purpose specified.

31. In combination, a feed for the blanks or other articles, a pair of formers supported one in advance of the other and having longitudinal engaging edges arranged out of alinement with each other, and means for bending the blanks or other articles upon the formers, substantially as and for the purpose set forth.

32. In combination, a feed for the blanks or other articles, means for bending longitudinal portions of the blanks or other articles at angles to adjacent parts thereof, a feed for applying glue to said blanks or other articles, and means for folding longitudinal portions of the blanks or other articles upon adjacent parts thereof and upon the surfaces to which the glue is applied, the longitudinal portions folded by the second means being formed of different width than the longitudinal portions bent by the first means, substantially as and for the purpose described.

33. In combination, a feed for the blanks or other articles, formers arranged one in advance of the other for engaging the blanks or other articles, said formers having their adjacent ends separated, a feed interposed between the adjacent ends of the formers for applying glue to the blanks, and means for bending the blanks or other articles upon the formers, substantially as and for the purpose specified.

34. In combination, a feed for the blanks or other articles, a former for engaging said blanks or other articles, a portion of the former being provided with diverging edges, a series of rollers arranged one in front of the other in advance of the diverging edges of the former for bending said blanks or other articles upon the former, said rollers being provided with engaging faces disposed at different angles to the adjacent edges of the former, a second former arranged at the rear of the first former, and means for bending said blanks or other articles upon the second former, substantially as and for the purpose set forth.

35. In combination, a feed for the blanks or other articles, a former for engaging said blanks or other articles, a portion of the former being provided with diverging edges, a series of rollers arranged one in front of the other in advance of the diverging edges of the former for bending said blanks or other articles upon the former, said rollers being provided with engaging faces disposed at different angles to the adjacent edges of the former, a second former arranged at the rear of the first former and consisting of separated substantially-parallel bars or divisions one of which is adjustable laterally toward and away from the other, and a series of rollers arranged one in front of the other for bending said blanks or other articles upon the second folder, said rollers being provided with engaging faces disposed at gradually-decreasing angles to the adjacent edges of the second former, substantially as and for the purpose described.

36. In combination, a feed for the blanks or other articles, a former for engaging said blanks or other articles, rollers for bending the blanks or other articles upon the former, a second former supported at the rear of the first former and having an engaging edge arranged out of alinement with an engaging edge of the first former, and rollers for bending the blanks or other articles upon the second former, substantially as and for the purpose set forth.

37. In combination, a main frame, a movable frame secured to the main frame, a feed for applying glue to the blanks or other articles, and a blower detachably secured to the movable frame for cooling the glue applied to said blanks or other articles, substantially as and for the purpose set forth.

38. In combination, a feed for the blanks or other articles, a pair of formers supported one in advance of the other and having longitudinal engaging edges arranged out of alinement with each other, a feed for applying glue to the blanks or other articles, a blower for cooling the glue applied to the blanks or other articles, and means for bending said blanks or other articles upon the former, substantially as and for the purpose specified.

39. In combination, a main frame, a feed for the blanks or other articles, means for lapping portions of the blanks or other articles upon additional portions of said blanks or other articles, a movable frame flexibly connected to the main frame, an adjuster for varying the position of the movable frame, a presser-piece for forcing together the lapped surfaces of the blanks or other articles, said presser-piece consisting of an endless belt having a portion of its advance end supported by the movable frame and inclined toward the feed, and rollers at the opposite ends of the inclined portion of the advance end of the presser-piece, substantially as and for the purpose set forth.

40. In combination, a feed for the blanks or other articles, a pair of formers supported one in advance of the other and having longitudinal engaging edges arranged out of alinement with each other, means for bending the blanks or other articles upon the formers, a presser-piece for engaging the blanks or other articles, said presser-piece consisting of an endless belt having its advance end supported above the rear former and the lower portion of said advance end inclined toward the feed, and rollers at the opposite ends of the inclined portion of the advance end of the presser-piece, substantially as and for the purpose set forth.

41. In combination, a main frame, a feed for the blanks or other articles, a movable frame connected to the main frame, a former supported by the movable frame for engaging the blanks or other articles, means for bending the blanks or other articles upon the former, a presser-piece for engaging the blanks or other articles, said presser-piece consisting of an endless belt having its advance end supported by the movable frame and a portion of said advance end inclined toward the feed, and rollers at the opposite ends of the inclined portion of the advance end of the presser-piece, substantially as and for the purpose described.

42. In combination, a main frame, a feed for the blanks or other articles, a former for engaging the blanks or other articles, said former being provided with a lengthwise slot, a movable frame connected to the main frame, a feed supported by the movable frame and movable within the lengthwise slot of the former for feeding the blanks or other articles, means for bending the blanks or other articles upon the former, a presser-piece for engaging the blanks or other articles, said presser-piece consising of an endless belt having its advance end supported above the former and the lower portion of said advance end inclined toward the feed, and rollers at the opposite ends of the inclined portion of the advance end of the presser-piece, substantially as and for the purpose specified.

43. In combination, a feed for the blanks or other articles, a pair of formers supported one in advance of the other and having longitudinal engaging edges arranged out of alinement with each other, means for bending the blanks or other articles upon the formers, a presser-piece for engaging the blanks or other articles, said presser-piece consisting of an endless belt having its advance end supported adjacent to the rear former and a portion of said advance end inclined toward the feed, and rollers at the opposite ends of the inclined portion of the advance end of the presser-piece, substantially as and for the purpose set forth.

44. In combination, a feed for the blanks or other articles, a pair of formers supported one in advance of the other and having longitudinal engaging edges arranged out of alinement with each other, means for bending the blanks or other articles upon the formers, a presser-piece for engaging the blanks or other articles, said presser-piece consisting of an endless belt having its advance end supported above the rear former and the lower portion of said advance end inclined toward the feed, rollers at the opposite ends of the inclined portion of the advance end of the presser-piece, and a second presser-piece arranged at the rear of the first presser-piece, substantially as and for the purpose described.

45. In combination, a feed for the blanks or other articles, a pair of formers supported one in advance of the other and having longitudinal engaging edges arranged out of alinement with each other, means for bending the blanks or other articles upon the formers, and means for squeezing said blanks or other articles, substantially as and for the purpose specified.

46. In combination, a drum, means for conducting the blanks or other articles to and from the drum, means for folding the blanks or other articles before their passage to the drum, and means for intermittently squeezing said blanks or other articles after their passage beyond the drum, substantially as and for the purpose specified.

47. In combination, a feed for the blanks or other articles, a pair of formers supported one in advance of the other and having longitudinal engaging edges arranged out of alinement with each other, means for bending the blanks or other articles upon the formers, and a series of presser-rollers arranged one in advance of the other, substantially as and for the purpose set forth.

48. In combination, a drum, means for feeding the blanks or other articles to and from the drum, a pair of formers supported one in advance of the other, means for bending the blanks or other articles upon the formers, presser-rollers extending crosswise of the drum and arranged at intervals at the rear of the formers and in proximity to the drum, and means for squeezing said blanks or other articles after their passage beyond the drum, substantially as and for the purpose described.

49. In combination, a drum, means for feeding the blanks or other articles to and from the drum, presser-rollers arranged at intervals crosswise of the drum and in proximity to said drum, and means for intermittently squeezing said blanks or other articles after their passage beyond the drum, substantially as and for the purpose set forth.

50. In combination, a feed for the blanks or other articles, means for lapping portions of the blanks or other articles upon additional portions of said blanks or other articles, a presser-piece for forcing together the lapped surfaces of the blanks or other articles, said presser-piece consisting of an endless belt having a portion of its advance end inclined rearwardly toward said feed, rollers at the opposite ends of the inclined portion of the advance end of the presser-piece, a drum at the rear of the inclined portion of the advance end of the presser-piece, and means for holding the blanks or other articles in engagement with the drum, substantially as and for the purpose described.

51. In combination, a drum, means for feeding the blanks or other articles to and from the drum, a feed for applying glue to the blanks or other articles, a blower arranged in proximity to the drum for cooling the glue applied to the blanks or other articles, and means for intermittently squeezing said blanks or other articles, substantially as and for the purpose specified.

52. In combination, a feed for the blanks or other articles, a feed for applying glue to the blanks or other articles, means for folding said blanks or other articles, and means for intermittently squeezing said blanks or other articles, substantially as and for the purpose set forth.

53. In combination, a drum, means for conducting the blanks or other articles to and from the drum, means for folding the blanks or other articles, and means for intermittently squeezing said blanks or other articles, substantially as and for the purpose described.

54. In combination, a drum, a feed for conducting the blanks or other articles to and from the drum, a feed for applying glue to the blanks or other articles, a blower for cooling the glue applied to the blanks or other articles, presser-rollers arranged at intervals crosswise of the drum and in proximity to said drum, and means for intermittently squeezing said blanks or other articles, substantially as and for the purpose specified.

55. In combination, a feed for the blanks or other articles, a pair of formers supported one in advance of the other and having longitudinal engaging edges arranged out of alinement with each other, means for bending the blanks or other articles upon the formers, and means for intermittently squeezing said blanks or other articles, substantially as and for the purpose specified.

56. In combination, a feed for the blanks or other articles, a pair of formers supported one in advance of the other and having longitudinal engaging edges arranged out of alinement with each other, means for bending the blanks or other articles upon the formers, a presser-piece for engaging the blanks or other articles, said presser-piece consisting of an endless belt having its advance end supported adjacent to the rear former, and a portion of its advance end inclined toward the feed, rollers at the opposite ends of the inclined portion of the advance end of the presser-piece, and means for intermittently squeezing said blanks or other articles, substantially as and for the purpose set forth.

In testimony whereof I have hereunto signed my name, in the presence of two attesting witnesses, at Rochester, in the county of Monroe, in the State of New York, this 13th day of April, 1897.

ARTHUR B. COWLES.

Witnesses:
CHESTER F. KIEHEL,
ALBERT H. WATERSTEAAT.